United States Patent [19]
Williams et al.

[11] Patent Number: 5,539,610
[45] Date of Patent: *Jul. 23, 1996

[54] FLOATING DRIVE TECHNIQUE FOR REVERSE BATTERY PROTECTION

[75] Inventors: Richard K. Williams; Lorimer K. Hill, both of Cupertino, Calif.

[73] Assignee: Siliconix incorporated, Santa Clara, Calif.

[ * ] Notice: The term of this patent shall not extend beyond the expiration date of Pat. No. 5,517,379.

[21] Appl. No.: 67,365

[22] Filed: May 26, 1993

[51] Int. Cl.⁶ .......................................... H02H 3/18
[52] U.S. Cl. ........................ 361/246; 361/245; 361/84; 361/82; 307/10.7; 307/130; 307/131
[58] Field of Search .................. 361/84, 246, 82, 361/77, 79, 245, 42, 245, 246; 307/10.7, 10.6, 10.8, 127, 130, 134, 127, 138; 320/25, 26; 327/434; 340/636; 257/339

[56] References Cited

U.S. PATENT DOCUMENTS

| | | | |
|---|---|---|---|
| 4,680,516 | 7/1987 | Guzik et al. | 318/326 |
| 4,808,839 | 2/1989 | Dunn et al. | 307/296.4 |
| 4,835,649 | 5/1989 | Salerno | 361/79 |
| 4,857,985 | 8/1989 | Miller | 357/42 |
| 4,992,683 | 2/1991 | Robin | 307/120 |
| 5,109,162 | 4/1992 | Koch et al. | 361/84 |
| 5,156,989 | 10/1992 | Williams et al. | 437/41 |
| 5,181,091 | 1/1993 | Harrington, III et al. | 257/355 |
| 5,229,633 | 7/1993 | Fisher et al. | 257/339 |

FOREIGN PATENT DOCUMENTS

| | | | |
|---|---|---|---|
| 3535788A1 | 2/1986 | Germany | H02H 3/18 |
| 3930091A1 | 4/1991 | Germany | H02H 7/00 |
| 9311361.7 | 9/1993 | Germany | H02H 3/18 |

*Primary Examiner*—Jonathan Wysocki
*Assistant Examiner*—Peter Ganjoo
*Attorney, Agent, or Firm*—Skjerven, Morrill, MacPherson, Franklin Friel; David E. Steuber

[57] ABSTRACT

A MOSFET is used to protect a battery driven load against the effects of a reverse-connected battery. This invention is particularly suitable for use with loads, such as those commonly found in motor vehicles, which contain semiconductor devices that may be severely damaged by a reverse voltage. The source of the MOSFET is connected to the positive terminal of the battery, and a gate driver circuit is used to provide a gate to source voltage sufficient to turn the MOSFET on when the battery is properly connected. If the battery is connected in reverse, the gate driver turns the MOSFET off, and the intrinsic body-drain diode in the MOSFET prevents a reverse current flow through the load. In conjunction with the MOSFET, a sensing device sends out a warning signal which may be used, for example, to turn off a portion of the load if the output of the battery falls below a level necessary to maintain the MOSFET in a fully on condition.

30 Claims, 4 Drawing Sheets

5,539,610

FLOATING DRIVE TECHNIQUE FOR REVERSE BATTERY PROTECTION

FIELD OF THE INVENTION

This invention relates to a technique for protecting integrated circuits and other semiconductor devices against damage when the battery by which they are powered is connected in reverse. In particular, this invention relates to a technique of protecting integrated circuit devices in a motor vehicle against damage from a reverse-connected battery.

BACKGROUND OF THE INVENTION

The introduction of integrated circuit and semiconductor devices to motor vehicles has greatly increased the control capability available to the designer. At the same time, however, it has created a need to protect these components against a reverse-connected battery. Many semiconductor devices such as microcomputers, for example, contain a diode connected between the supply voltage and ground. When the battery is properly connected (i.e., with the negative terminal connected to chassis ground) these diodes are reverse biased. When the battery is reversed, however, these diodes become forward-biased. The resulting high currents will almost certainly destroy the device. Thus, all such devices must be protected against a reverse-connected battery.

In many motor vehicles a Schottky diode is connected in series with the load, so that it is forward-biased when the battery is properly connected. If the battery is reversed, the diode becomes reverse-biased and the loads are protected from reverse currents or negative voltages. A disadvantage of this technique is that during normal operation a voltage drop exists across the forward-biased diode and heat energy is generated. For example, a 60 volt Schottky diode might generate a 0.8 volt drop, and with a current flow of 20 amps about 14 watts of heat energy would be generated. This heat must be transferred away from the diode. Heat sinks are becoming more difficult to find in motor vehicles, however, because more parts are being made of plastic. The metal surfaces in the engine compartment are generally too hot to serve as heat sinks.

The most attractive solution to this problem would be a device which approximates as closely as possible an ideal diode, with an equivalent resistance in the forward direction of no more than 50 milliohms. One possibility would be to connect a low on-resistance N-channel power MOSFET in series with the load, with its source connected to the battery and its drain connected to the load. Properly driven, during normal operation the power MOSFET's low resistance channel would shunt any current away from the intrinsic drain-body diode, producing a low on-state voltage drop. The diode formed by the drain-to-body junction is in parallel to the MOSFET's source-to-drain terminals whenever the source-body short is employed in a MOSFET. The source-body short is common in a vertical DMOS. When the battery is reversed, the MOSFET would be shut off, leaving the intrinsic drain-to-body diode reverse-biased. However, to turn the MOSFET on, its gate must be biased at least 8 volts above its source, which is connected to the battery. A charge pump or similar means is necessary to produce a gate-source voltage of a magnitude sufficient to guarantee that the MOSFET will be fully turned on. This charge pump must therefore have one terminal connected directly to the battery.

If a semiconductor device is used to provide the gate-source voltage, this device is susceptible to the same reverse-battery problems as the other devices in the motor vehicle. That is, if the gate driver is connected directly to the battery's plus and minus terminals (i.e., between the vehicle's "hot" and ground terminals), it will be subjected to a reverse potential if the battery is hooked up in reverse. In many self-isolated and junction-isolated IC technologies, a reverse battery connection will forward-bias many junctions in the IC, flood the substrate with minority carriers, or cause latch-up, excessive heating or other undesirable effects.

SUMMARY OF THE INVENTION

In accordance with this invention, a power MOSFET is connected in series with a battery-driven load. The source of the MOSFET is connected to the battery; the drain is connected to the load. The MOSFET's gate is driven by a "floating" driver which is not connected across the terminals of the battery, except via a high resistance signal path incapable of high reverse currents. Instead, the floating driver is connected only to the positive terminal of the battery and contains no logic or control circuitry which is powered by a DC conduction path to ground. The gate driver is associated with a ground-referenced "low-side" controller that is not directly connected to the battery's "hot" line but is powered from the protected side of the power MOSFET. Thus, neither the gate driver nor the control circuitry is susceptible to being reverse-biased in the event that the battery is connected in reverse. The gate driver contains a device that shorts the gate to the source of the MOSFET, thereby turning it off, if the battery is reversed. In a preferred embodiment, this device is a depletion mode MOSFET.

In accordance with another aspect of this invention, a sensing device detects when the voltage of the battery (properly connected) falls to the point where the protective MOSFET is not fully turned on. The sensing device generates a signal which causes an appropriate corrective action to be taken-for example, switching off all or a portion of the load.

DESCRIPTION OF THE INVENTION

FIG. 1 shows a power MOSFET 10 connected in series between a battery 11 and a load 12. MOSFET 10 is an N-channel power MOSFET such as the model SMP60N06-18 manufactured by Siliconix, Inc. A diode 13 represents the body to drain diode in MOSFET 10. Load 12 represents the entire "load" of, for example, an automobile electrical system, including all active devices, switches, and protective devices. Load 12 may contain, for example, diodes or other elements for protecting various components against large positive or negative voltage transients. These elements operate in conjunction with power MOSFET 10, which protects the various electronic components in the load against a reversed battery condition.

Figure 1A:
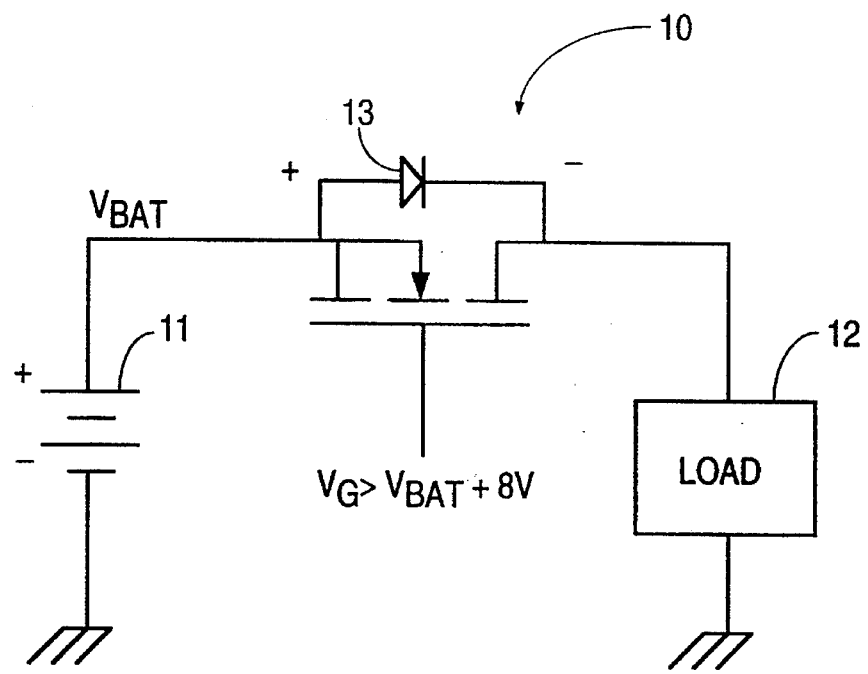
FIGS. 1A and 1B illustrate circuit diagrams of a power MOSFET according to this invention in normal operation and in reverse-battery operation, respectively.

FIG. 1A shows MOSFET 10 in normal operation, with its source connected to the positive terminal of battery 11 and its drain connected to load 12. The negative terminal of battery 11 is connected to ground; its positive terminal provides a voltage $V_{BAT}$ (normally 12 volts). To ensure that MOSFET 10 is turned on, its gate terminal must be maintained at a voltage $V_G$ which is at least 8 volts above $V_{BAT}$. In this situation, current flows through the N-channel of MOSFET 10, which is a low resistance path, and diode 13 is effectively shunted out.

Figure 1B:
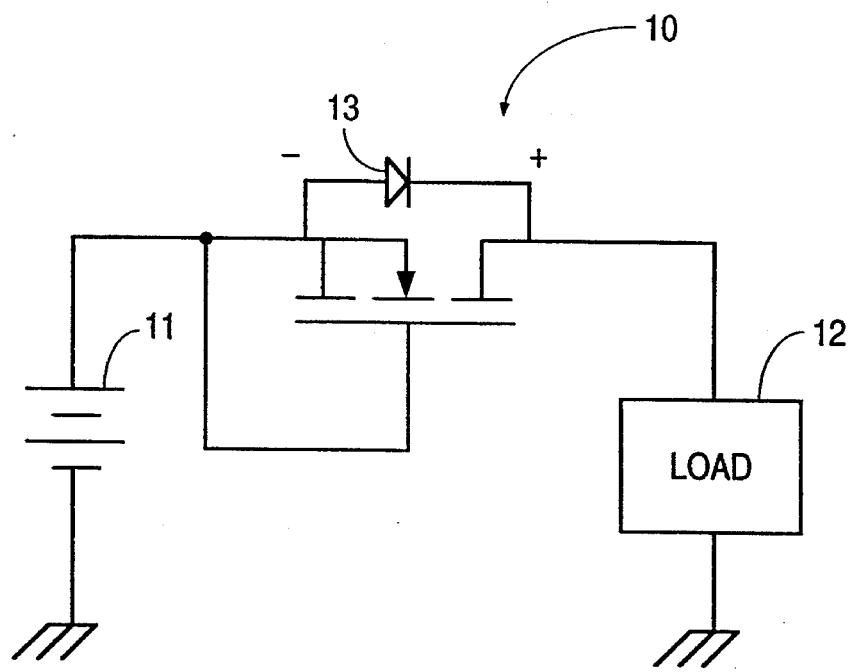

FIG. 1B illustrates MOSFET 10 when battery 11 has been connected in reverse. The gate and source of MOSFET 10 have been shorted ($V_{GS}=0$) and MOSFET 10 has therefore been turned off. Diode 13 is reverse biased, and accordingly there is practically no current flow through MOSFET 10. The entire voltage drop of battery 10 is therefore sustained by MOSFET 10, and the various devices within load 12 are protected against the reverse potential.

Figure 2:
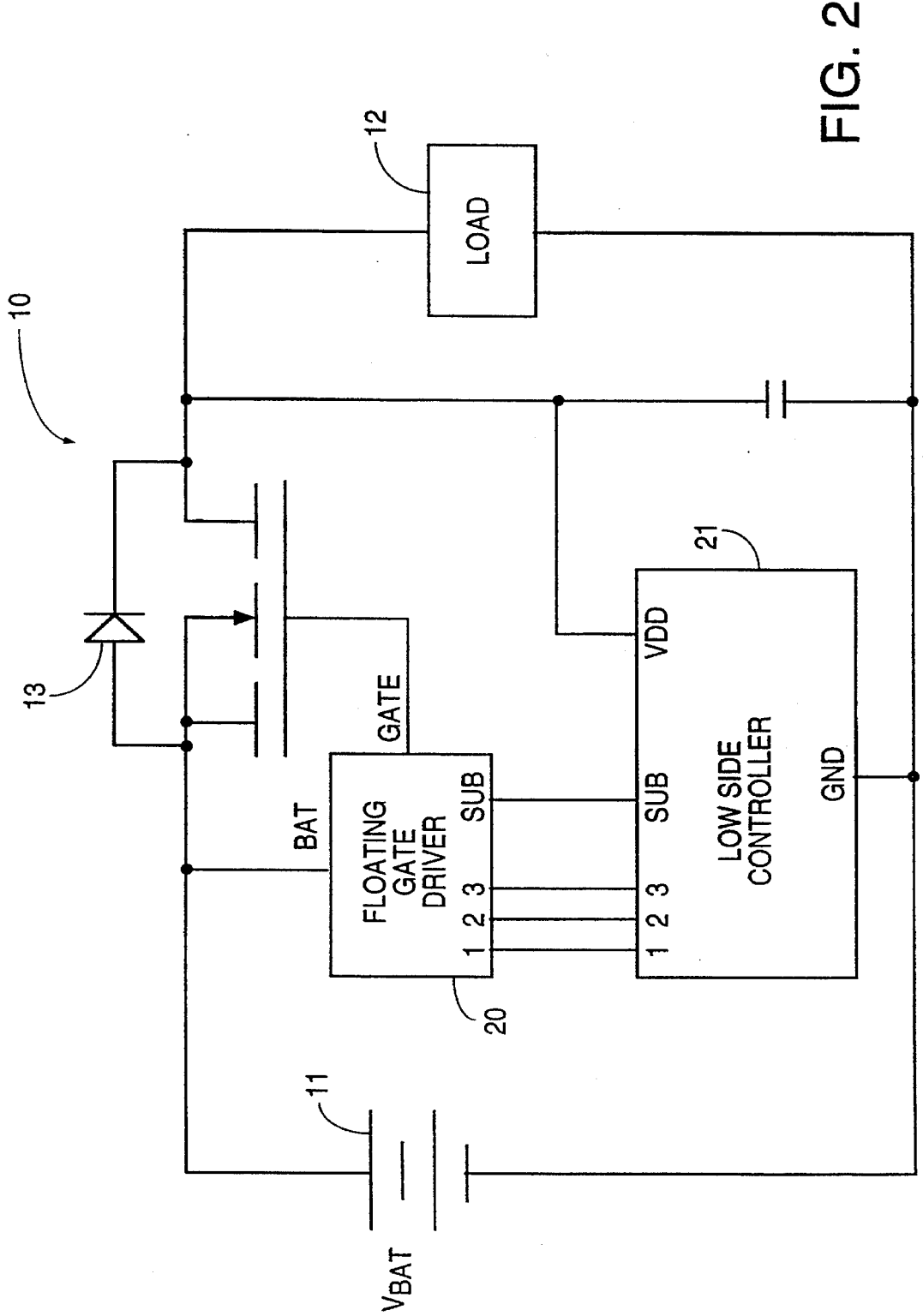
FIG. 2 illustrates a block diagram showing a floating gate driver and a low side controller in accordance with the invention.

FIG. 2 illustrates a block diagram of the circuitry used to control the source-to-gate voltage $V_{GS}$ of MOSFET 10. A "floating" gate driver 20 is connected between the positive terminal of battery 11 and the gate of MOSFET 10. A low side controller 21 is connected between ground and the drain of MOSFET 10. In this embodiment gate driver 20 and controller 21 are located on separate ICs which are connected together at pins designated 1, 2, 3 and SUB. The SUB pins connect to the substrates of floating gate driver 20 and controller 21.

Figure 3:
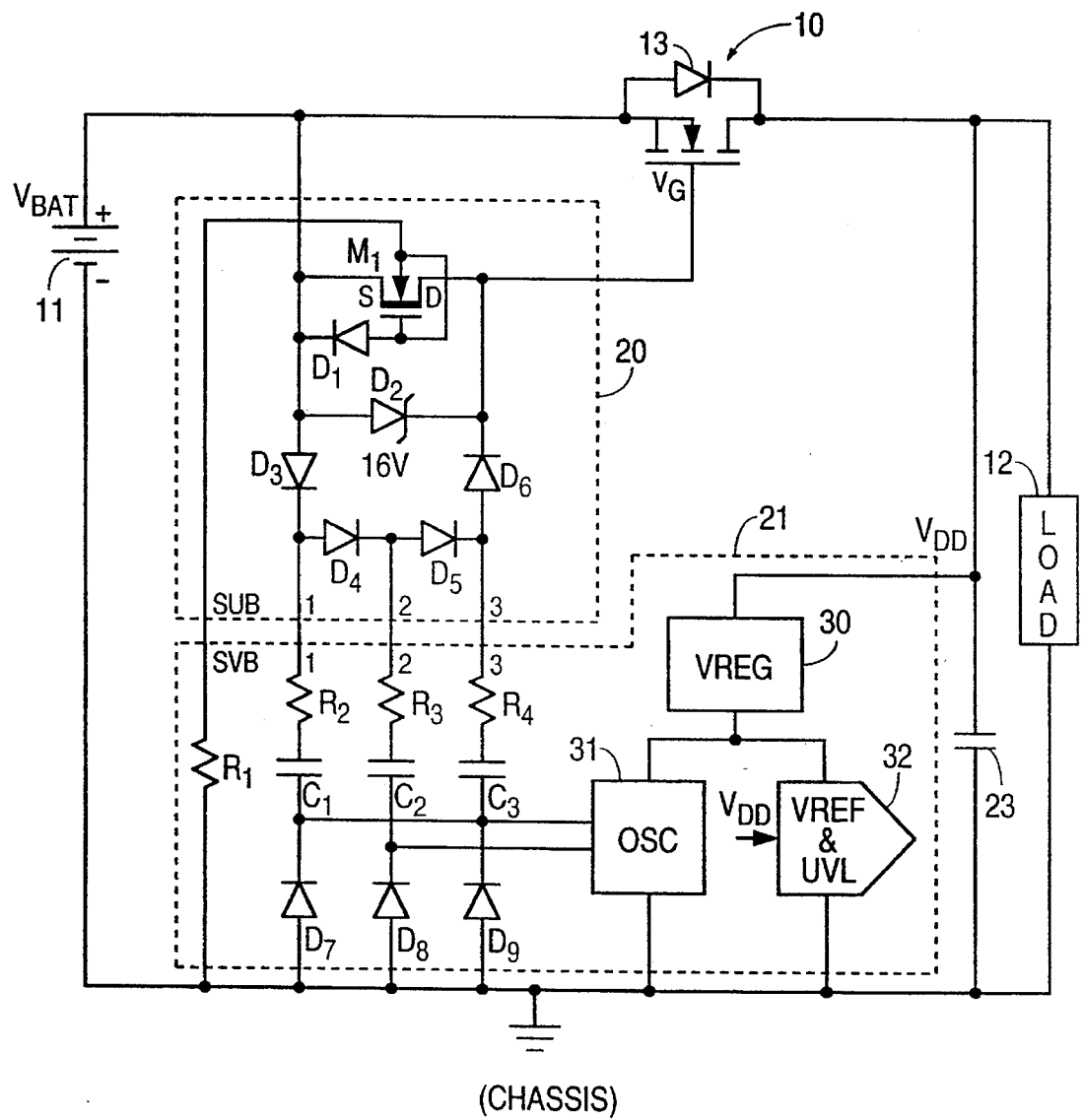
FIG. 3 illustrates a circuit diagram of the floating gate driver and the low side controller.

FIG. 3 illustrates some of the circuitry within gate driver 20 and controller 21. A voltage regulator 30 is connected to the "protected" side of MOSFET 10. Under normal circumstances, the load is initially provided by forward-biasing diode 13. After start-up, the charge pump circuit increases the drive on MOSFET 10 and shunts the current from diode 13 through the MOSFET's channel. Voltage regulator 30 provides a voltage of, for example, 5 V to an oscillator 31. The two outputs of oscillator 31 drive a charge pump which includes capacitors $C_1$–$C_3$ and diodes $D_3$–$D_6$. One output of oscillator 31 is connected to capacitors $C_1$ and $C_3$; the other output is connected to capacitor $C_2$. When the outputs of oscillator 31 provide signals approximately 180° out of phase with each other, in a manner well known in the art charge is transferred in stages from capacitor $C_1$ to capacitor $C_2$ to capacitor $C_3$, and then to the gate of MOSFET 10. Assuming that $V_{BAT}=12V$, the charge pump would ordinarily deliver a $V_G \approx 34V$, or a $V_{GS}$ of about 22V. However, since a $V_{GS}$ of 22V might cause breakdown of the gate insulation layer in MOSFET 10, a zener diode $D_2$ clamps $V_{GS}$ at a maximum of 16V.

If battery 11 is connected in reverse, the gate and source of MOSFET 10 are shorted by a depletion mode MOSFET $M_1$. The source of depletion mode MOSFET $M_1$ is connected to the source of MOSFET 10; the drain of depletion mode MOSFET M1 is connected to the gate of MOSFET 10. The gate and body of MOSFET $M_1$ are shorted together and are connected via a diode $D_1$ to battery 11 and via a relatively large resistor $R_1$ to ground. As is typical with depletion mode MOSFETs, MOSFET $M_1$ is turned on when its $V_{GS}=0$, and turns off only when its source is biased below its gate by an amount equal to or greater than the pinch-off voltage $V_T$ for the device (i.e., $V_{GS} \leq V_T$). The purpose of the ground connection is essentially to provide an input signal (not shown) to the high side. Since this ground connection is only a signal path, the current can be limited by a large value of resistor $R_1$.

The operation of this circuit will be described with reference to three possible situations. The first situation is where the battery is connected and functioning properly, i.e., typically $V_{BAT}=12V$. Since the source of MOSFET $M_1$ is connected to the high side of battery 11, and its gate is grounded, $V_{GS}$ for MOSFET $M_1$ is equal to approximately −12V. MOSFET $M_1$ has a pinch-off voltage of about −5V, so that at a $V_{GS}=-12V$, MOSFET $M_1$ is turned off. Thus, as described above, the charge pump drives the gate of MOSFET 10 until $V_{GS}$ for MOSFET 10 is equal to about 16V. Thus, current flows through the N channel of MOSFET 10, and MOSFET 10 typically shows a resistance of only about 18–50 milliohms.

The second situation is where battery 11 has been connected in reverse. In this situation, the $V_{GS}$ of MOSFET $M_1$ is approximately +12V, and therefore MOSFET $M_1$ is turned on. This shorts the gate and source of MOSFET 10, turning MOSFET 10 off and preventing the semiconductor components of load 12 from seeing the reverse voltage. In dynamic terms, MOSFET $M_1$ shorts the gate and source of MOSFET 10 and thereby takes all of the energy out of the gate capacitor of MOSFET 10 before the reverse voltage appears across MOSFET 10. Thus, when the reverse voltage appears across MOSFET 10, that device is already turned off.

MOSFET $M_1$ is protected against the reverse voltage because its inherent source-body diode is connected in series with a relatively large resistor $R_1$. The value of resistor $R_1$ may be, for example, 10K ohms. As noted above, gate driver 20 and controller 21 are on different chips. The oscillator 31 and other components in the controller 21 are not affected by the forward-biasing of the source-body diode in MOSFET $M_1$. Moreover, even if MOSFET $M_1$ snaps back or latches up, that will short the gate to the source of MOSFET 10 even faster. So, even in the unlikely event that gate driver 20 temporarily fails to function properly, it will merely turn MOSFET off faster. The current-limiting resistor $R_1$ and capacitors $C_1$–$C_3$ prevent any adverse consequences to the circuitry in the controller 21. The high side circuit can be understood as a circuit with no low-resistance connection between its substrate and ground. It is therefore incapable of strongly forward-biasing its internal substrate junctions. The low resistance path needed to drive the gate of MOSFET 10 is provided by the AC coupling of capacitors $C_1$, $C_2$ and $C_3$. These capacitors represent a DC "open" connection incapable of continuous current.

The third situation is where battery 11 is connected properly, but the output of battery 11 drops to, for example, 4 or 5V. Since this is near the pinch-off voltage of MOSFET $M_1$, MOSFET $M_1$ is slightly on and is allowing some leakage from the gate of MOSFET 10. MOSFET $M_1$ is not fully on, however. Moreover, the $V_{GS}$ of MOSFET 10 is only in the neighborhood of 8–10V in this situation, and therefore MOSFET 10 approaches turn off, where it may saturate. In this situation, a large voltage drop may develop across MOSFET 10. At high currents the resulting high power dissipation may overheat and damage MOSFET 10. If $V_{GS}$ of MOSFET 10 falls below about 8V above ground (or 4V above $V_{BAT}$), MOSFET 10 will turn off and all of the current will flow through diode 13. This will dissipate a considerable amount of power.

The solution to this problem lies in under-voltage lockout (UVL) circuit 32. UVL circuit 32 monitors the voltage $V_{DD}$ across load 12. When $V_{DD}$ drops below, for example, 6V, UVL circuit 32 sends out a signal which instructs the system to begin shutting off some of the load elements within load 12. It continues to do this until the load current falls to the point where it can be supported by the available driving voltage $V_{GS}$ at the gate of MOSFET 10. Otherwise, with a substantial portion of the current flowing through diode 13, MOSFET 10 will begin to heat up, and this will create a heat dissipation problem. UVL circuit 32 thus acts as a sensing device to determine when $V_{DD}$ is within the "danger region" between 0 and +6V and where MOSFET 10 is either off or only partially on.

Figure 4:
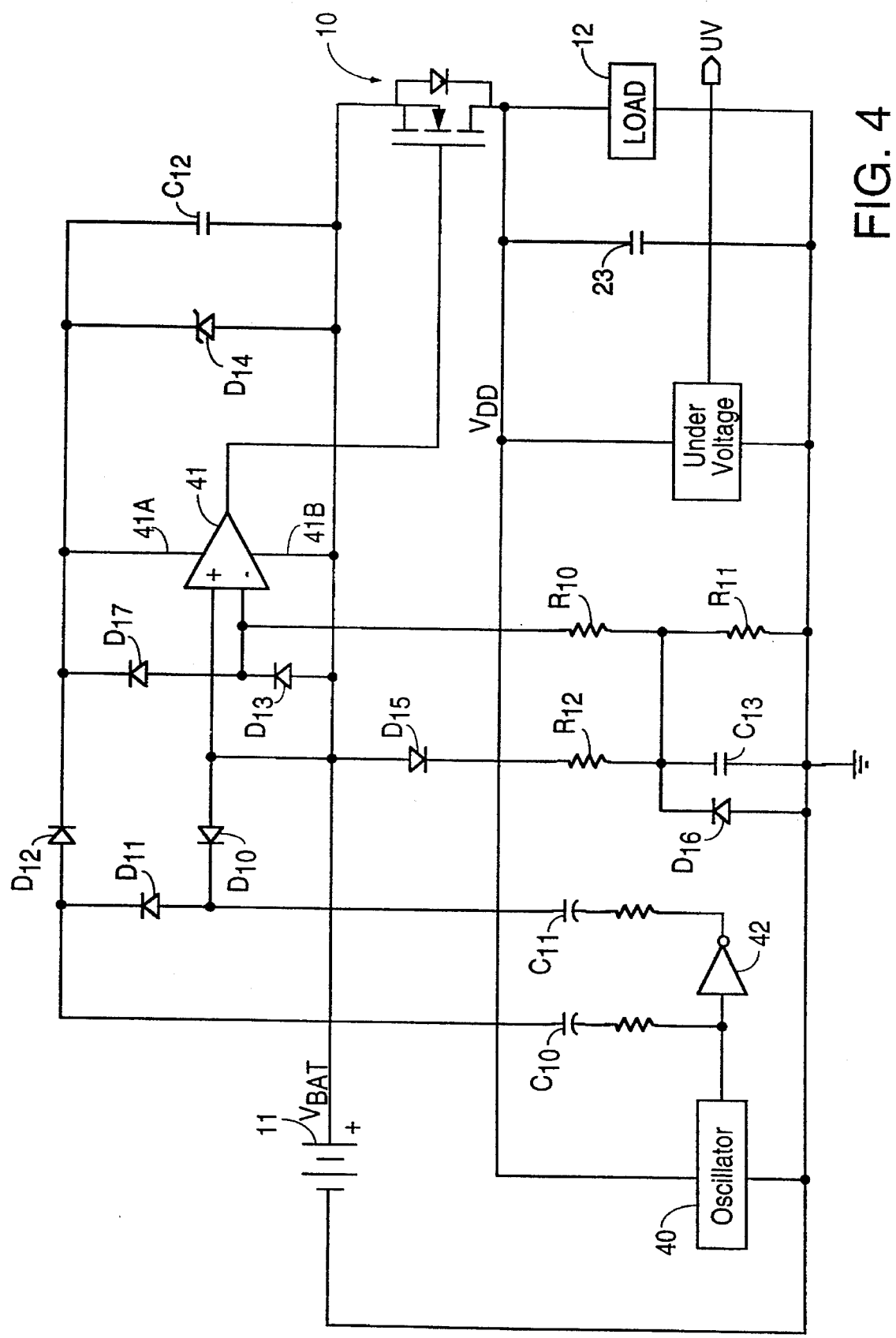
FIG. 4 illustrates an alternative embodiment of the invention which uses a comparator to drive the gate of the protective MOSFET.

FIG. 4 illustrates an alternative embodiment which uses a comparator 41 to drive the gate of MOSFET 10. MOSFET 10, battery 11 and load 12 are connected in series as in FIG. 3. An oscillator 40 drives a charge pump which includes an inverter 42, capacitors $C_{10}$ and $C_{11}$ and diodes $D_{10}$, $D_{11}$ and $D_{12}$. While the charge pump in this embodiment contains only three diodes, as compared with four diodes in the embodiment of FIG. 3, it will be apparent that various kinds of charge pumps employing various numbers of diodes or other elements may be used to satisfy specific requirements. The charge produced by the charge pump is stored on a capacitor $C_{12}$, the low side of which is connected to the positive terminal of battery 11. A zener diode $D_{14}$ limits the voltage across capacitor $C_{12}$ to about 15 V. This charge is delivered to a power input 41A of comparator 41, the other power input 41B of comparator 41 being connected to the positive terminal of battery 11. A conduction path is formed between the positive terminal of battery 11 and ground by a diode $D_{13}$ and resistors $R_{10}$ and $R_{11}$. The common point between diode $D_{13}$ and resistor $R_{10}$ is connected to the negative input of comparator 41.

Thus when battery 11 is connected properly, the voltage at the positive input of comparator 41 exceeds the voltage at the negative input of comparator 41 by the amount of the voltage drop across forward-biased diode $D_{13}$ (about 0.7 V). As a result, the voltage stored on capacitor $C_{12}$, which is limited to about 15V by zener diode $D_{14}$, is delivered at the output of comparator 41 to the gate terminal of MOSFET 10. Assuming that this voltage $V_{GS}$ is greater than about 8V, MOSFET 10 is turned on and provides a low on-resistance conduction path between battery 11 and load 12. If battery 11 is reversed, the polarity of the voltages applied at the inputs of comparator 41 is reversed (i.e., the negative terminal of battery 11 is connected directly to the positive input of comparator 41 and the positive terminal of battery 11 is connected to the negative input of comparator 41 via a diode $D_{16}$ and a resistor $R_{10}$). Comparator 41 supplies a $V_{GS}$=0V to the gate of MOSFET 10. MOSFET 10 is therefore turned off and intrinsic diode 13 blocks a reverse flow of current through load 12. Because the reversed battery condition leads to a DC current from $V_{BAT}$ to ground, which must flow through high value resistors $R_{10}$ and $R_{11}$, no substantial current can flow.

Another conduction path between the positive terminal of battery 11 and ground is formed by a diode $D_{15}$, a resistor $R_{12}$ and a capacitor $C_{13}$. In normal operation, diode $D_{15}$ charges capacitor $C_{13}$ through resistor $R_{12}$, which serves as a current-limiting resistor. Capacitor $C_{13}$ serves as a voltage reference. When the battery voltage falls rapidly, the polarity of the voltage across diode $D_{15}$ is reversed and this in effect disconnects the battery from capacitor $C_{13}$. Resistor $R_{11}$ provides a relatively long time constant for discharging capacitor $C_{13}$ when the battery is disconnected or when the battery remains reversed. Resistor $R_{10}$ limits current through diode $D_{17}$ and Zener diode $D_{14}$ when the battery is reversed. Diode $D_{16}$, connected in parallel with capacitor $C_{13}$, prevents capacitor $C_{13}$ from being charged by the reversed battery, which could be harmful to an electrolytic capacitor.

The embodiments described above are intended to be illustrative and not limiting. Many alternative embodiments in accordance with this invention will be apparent to those skilled in the art. All such alternative embodiments are included within the broad scope of this invention, as defined in the following claims.

We claim:

1. A combination comprising:
   a battery;
   a load;
   a device for protecting said load against the effect of a reverse-connected battery, said device comprising:
      a MOSFET connected in series with said battery and said load, said MOSFET having a source and a body connected to a positive terminal of said battery and a drain connected to said load when said battery is properly connected;
      first means for biasing said MOSFET into a conductive state when said battery is properly connected; and
      second means for biasing said MOSFET into a non-conductive state when said battery is reverse-connected;
      said first and second means being protected against the effects of said reverse-connected battery.

2. The combination of claim 1 wherein said first means comprises a charge pump connected to a gate of said MOSFET.

3. The combination of claim 2 wherein said second means comprises a means of shorting the gate of said MOSFET to the source of said MOSFET when said battery is reverse-connected, and wherein said charge pump comprises art oscillator, said means of shorting being located on a first IC chip, said oscillator being located on a second IC chip.

4. The combination of claim 3 wherein said means of shorting comprises a depletion mode device, said depletion mode device comprising a body region which forms a portion of a substrate of said first IC chip.

5. The combination of claim 4 wherein said body region is connected to a gate of said depletion mode device, said gate of said depletion mode device being connected to an anode of a diode, a source of said depletion mode device being connected to a cathode of said diode.

6. The combination of claim 2 wherein said charge pump is designed to provide an output which is at a higher potential than the potential of said positive terminal.

7. The combination of claim 6 comprising a zener diode connected between the source and the gate of said MOSFET.

8. The combination of claim 1 wherein said second means comprises a means of shorting the gate of said MOSFET to a source of said MOSFET when said battery is reverse-connected.

9. The combination of claim 8 wherein said means of shorting comprises a depletion mode device.

10. The combination of claim 9 wherein a gate of said depletion mode device is connected through a current-limiting resistor to a negative terminal of said battery when said battery is properly connected.

11. The combination of claim 1 wherein said MOSFET is an N-channel MOSFET.

12. The combination of claim 1 wherein said first and second means comprise a charge pump and a comparator, a power input of said comparator being connected to said charge pump, and an output of said charge pump being connected to a gate of said MOSFET.

13. A device for protecting a load from the effects of a reversed battery, said device comprising:
   a high-side terminal and a low-side terminal for connection to the positive and negative terminals of said battery, respectively, when said battery is properly connected to said device;

a power MOSFET having a source terminal connected to said high-side terminal and a drain terminal for connection to said load;

a charge pump connected to a gate terminal of said power MOSFET;

a depletion mode MOSFET connected between said gate terminal and said source terminal of said power MOSFET, said depletion mode MOSFET having a gate terminal connected through a current limiting device to said low-side terminal such that said depletion mode MOSFET is conductive which said positive terminal of said battery is connected to said low-side terminal and said negative terminal of said battery is connected to said high-side terminal.

14. The device of claim 13 wherein said charge pump is driven by an oscillator, said oscillator being supplied by a voltage regulator, said voltage regulator being connected to said drain terminal.

15. The device of claim 14 wherein said charge pump comprises a first diode, a capacitor, a resistor and a second diode connected in series between said low-side terminal and said gate of said power MOSFET, an output of said oscillator being connected to a node between said first diode and said capacitor.

16. The device of claim 15 wherein said first diode, said capacitor and said resistor are located on a first integrated circuit (IC) chip and said second diode is located on a second IC chip.

17. The device of claim 13 wherein a body of said depletion mode MOSFET is shorted to said gate of said depletion mode MOSFET.

18. The device of claim 13 further comprising a zener diode connected between said high-side terminal and said gate terminal of said power MOSFET.

19. The device of claim 13 further comprising an undervoltage lockout (UVL) circuit, an input of said UVL circuit being connected to said drain terminal of said power MOSFET, said UVL circuit being operative to shut off a portion of said load in response to a detected voltage at said input of said UVL circuit.

20. A device for protecting a load from the effects of a reversed battery, said device comprising:

a high-side terminal and a low-side terminal for connection to the positive and negative terminals of said battery, respectively, when said battery is properly connected to said device;

a power MOSFET having a source terminal connected to said high-side terminal and a drain terminal for connection to said load;

a comparator having an output terminal coupled to a gate terminal of said power MOSFET, said comparator adapted to supply a voltage so as to turn said power MOSFET on when said battery is properly connected to said high-side and low-side terminals and to supply a voltage so as to turn said MOSFET off when said battery is reverse-connected to said high-side and low-side terminals.

21. The device of claim 20 wherein a first power input of said comparator is connected to an output of a charge pump.

22. The device of claim 21 wherein a second power input of said comparator is connected to said high-side terminal.

23. The device of claim 20 wherein a positive control input of said comparator is connected to said high-side terminal and a negative control input of said comparator is connected via a diode to said high-side terminal.

24. A method of protecting a load powered by a battery from the effects of said battery being reverse-connected, said method comprising:

connecting a MOSFET between said load and said battery, a source terminal and a body of said MOSFET being connected to a positive terminal of said battery and a drain terminal of said MOSFET being connected to said load;

biasing a gate terminal of said MOSFET so as to turn said MOSFET on when said battery is properly connected; and biasing said gate terminal so as to turn said MOSFET off when said battery is reverse connected.

25. The method of claim 24 wherein a charge pump is employed to turn said MOSFET on.

26. The method of claim 24 wherein a depletion mode MOSFET is employed to turn said MOSFET off.

27. The method of claim 24 wherein a comparator is employed to turn said MOSFET on and off.

28. A combination comprising:

a battery;

a load;

a device for protecting said load against the effect of a reverse-connected battery, said device comprising:

a MOSFET connected in series with said battery and said load, said MOSFET having a source and a body connected to a positive terminal of said battery and a drain connected to said load when said battery is properly connected;

a drain connected to said load when said battery is properly connected;

a charge pump connected to a gate of said MOSFET, said charge pump being supplied with power through said MOSFET when said battery is properly connected; and a depletion mode device connected between said gate of said MOSFET and said positive terminal, a gate of said depletion mode device being connected through a current-limiting device to a negative terminal of said battery when said battery is properly connected.

29. The combination of claim 28 wherein said charge pump comprises an oscillator, said depletion mode device being located on a first IC chip and said oscillator being located on a second IC chip.

30. The combination of claim 28 wherein said gate of said depletion mode device is shorted to a body region of said depletion mode device.

* * * * *